Patented Jan. 17, 1933

1,894,749

UNITED STATES PATENT OFFICE

OSKAR BAUDISCH, OF MAFFERSDORF, CZECHOSLOVAKIA

GAMMA FERRIC OXIDE HYDRATE AND METHOD OF MAKING SAME

No Drawing. Application filed September 18, 1929, Serial No. 393,587, and in Germany May 17, 1929.

This invention relates to a new product, chemically pure fabric oxide hydrate ($Fe_2O_3H_2O$) of the gamma configuration, and to a method of making the same.

It has long been known that two minerals, göthite and lepidocrocite, contain iron in the form $Fe_2O_3H_2O$, but differ in their crystalline form and in the fact that, when dehydrated by heating at a moderate temperature, lepidocrocite becomes ferromagnetic, while göthite does not. Since lepidocrocite has always been found to contain manganese oxide, it was thought that the presence of this impurity was the cause of the difference between its properties and those of göthite; but W. H. Albrecht (Ber. d. Deutschen Chem. Ges. 62, 1475, 1929) has shown that göthite and lepidocrocite have different X-ray spectrums. Albrecht also showed that there existed a hydrate free from manganese having the X-ray spectrum of lepidocrocite and possessing the same ferromagnetic qualities when dehydrated. This hydrate has been termed the gamma form to distinguish it from the alpha form of ferric oxide hydrate which occurs in göthite. Albrecht did not find any method by which gamma hydrate could be made with certainty, nor was he able to prepare it in pure form.

I have invented a method by which the gamma ferric oxide hyrate ($\gamma Fe_2O_3H_2O$) is for the first time produced with certainty and in chemically pure form. The method is simple and can easily be practiced commercially. The product has valuable therapeutic properties and is also useful as a catalyst.

The method consists in dissolving chemically pure iron in pure hydrochloric acid, and adding to the solution an excess of a non-metallic water-soluble base taken from the following class: pyridine, aniline, and similar ring compounds containing nitrogen, and passing air or oxygen through the solution. This results in the precipitation of chemically pure gamma $Fe_2O_3H_2O$.

I cite the following as a specific example of my method:

Chemically pure iron prepared by known methods from ferro-pentacarbonyl is dissolved in a solution of pure hydrochloric acid of a concentration of from five to thirty-five per cent to form a ferrous chlorine solution which is neutral to Congo paper. An excess of pyridine or aniline is added to the solution, and air is passed through the solution, causing a precipitation of gamma $Fe_2O_3H_2O$.

The product has a crystalline structure and X-ray spectrum similar to those of lepidocrocite, becomes ferromagnetic on dehydration, and is entirely free from manganese and all other metallic impurities.

What I claim is:

1. A process for preparing gamma ferric oxide hydrate, which consists in precipitating the same from a pure ferrous chloride solution with an organic base selected from the group consisting of pyridine and aniline in the presence of oxygen.

2. A process for preparing gamma ferric oxide hydrate, which consists in dissolving pure iron in a solution of hydrochloric acid, adding to the solution an organic base selected from the group consisting of pyridine and aniline, and passing oxygen through the solution to cause a precipitation.

3. A process for preparing gamma ferric oxide hydrate, which consists in dissolving pure iron in a solution of hydrochloric acid, adding pyridine to the solution, and passing oxygen through the solution to cause a precipitation.

4. A process for preparing gamma ferric oxide hydrate, which consists in dissolving pure iron obtained from ferro-pentacarbonyl in a solution of hydrochloric acid until the solution becomes neutral to Congo paper, adding to the solution an organic base selected from the group consisting of pyridine and aniline, and passing oxygen through the solution to cause precipitation.

5. Chemically pure gamma ferric oxide hydrate adapted for therapeutic uses precipitated from a pure ferrous chloride solution by an organic base selected from the group consisting of pyridine and aniline, in the presence of oxygen.

In testimony whereof I have hereunto set my hand.

OSKAR BAUDISCH.

CERTIFICATE OF CORRECTION.

Patent No. 1,894,749. January 17, 1933.

OSKAR BAUDISCH.

It is hereby certified that error appears in the printed specification of the above numbered patent requiring correction as follows: Page 1, line 2, for "fabric" read "ferric", and line 53, for "chlorine" read "chloride"; and that the said Letters Patent should be read with these corrections therein that the same may conform to the record of the case in the Patent Office.

Signed and sealed this 28th day of February, A. D. 1933.

M. J. Moore,
Acting Commissioner of Patents.

(Seal)